US006624220B1

(12) United States Patent
Waddell et al.

(10) Patent No.: US 6,624,220 B1
(45) Date of Patent: *Sep. 23, 2003

(54) TRANSPARENT AND COLORABLE ELASTOMERIC COMPOSITIONS

(75) Inventors: Walter H Waddell, Pasadena, TX (US); Robert R. Poulter, League City, TX (US); Kenneth O. McElrath, Houston, TX (US); John E. Rogers, Houston, TX (US); Wai K. Wong, Wezembeek-Oppem (BE); Hsien C. Wang, Bellaire, TX (US); Timothy A. Mills, Rixensart (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 159 days.

This patent is subject to a terminal disclaimer.

(21) Appl. No.: 09/592,757

(22) Filed: Jun. 13, 2000

Related U.S. Application Data

(63) Continuation-in-part of application No. 09/211,628, filed on Dec. 15, 1998.
(60) Provisional application No. 60/069,599, filed on Dec. 15, 1997.

(51) Int. Cl.[7] .................................................. C08K 5/24
(52) U.S. Cl. ........................ 524/265; 524/515; 524/528
(58) Field of Search ................. 524/265, 515, 524/528

(56) References Cited

U.S. PATENT DOCUMENTS

| 3,824,160 A | 7/1974 | Hartford .................. 204/89 |
| 4,074,035 A | 2/1978 | Powers et al. ............. 526/185 |
| 5,013,793 A | 5/1991 | Wang et al. |
| 5,063,268 A | 11/1991 | Young ..................... 524/286 |
| 5,162,409 A | 11/1992 | Mroczkowski ............. 524/262 |
| 5,227,425 A | 7/1993 | Rauline ................... 524/493 |
| 5,333,662 A | 8/1994 | Costemalle et al. ........ 152/510 |
| 5,376,438 A | 12/1994 | Costemalle et al. ........ 428/216 |
| 5,532,312 A | 7/1996 | Gursky et al. ............. 525/232 |

FOREIGN PATENT DOCUMENTS

| DE | 43 08 311 | 9/1994 |
| EP | 0 682 071 B1 | 7/1997 |
| WO | WO 86/02088 | 10/1986 |
| WO | WO 91/19761 | 12/1991 |
| WO | WO 92/03302 | 3/1992 |
| WO | WO 92/16587 | 10/1992 |
| WO | WO 99/31178 | 6/1999 |

OTHER PUBLICATIONS

W.F. Helt, B.H. To and W.W. Paris, "Post Vulcanization Stabilization for NR", *Rubber World*, Aug., 1991, pp. 18–24.
A.S. Farid, "Formulation Design and Curing Characteristics of NBR Mixes for Seal", *Rubber World*, Sep., 1993—pp. 25–30.

Primary Examiner—Peter D. Mulcahy
(74) Attorney, Agent, or Firm—Leandro Arechederra; Kevin M. Faulkner

(57) ABSTRACT

Transparent and colorable elastomeric compositions are provided. The transparent elastomeric compositions can be covulcanized with rubbers such as polybutadiene, polyisoprene, styrene-butadiene rubber, styrene-isoprene-butadiene rubber, isoprene-butadiene rubber, ethylene-propylene diene rubber or natural rubber. The colorable rubber compositions have sufficient properties to function as a reinforcing member in an automobile tire. Preferably, both the transparent and colorable elastomeric compositions include at least one copolymer of a $C_4$ to $C_7$ isoolefin and a para-alkylstyrene, silica and a coupling agent.

52 Claims, 1 Drawing Sheet

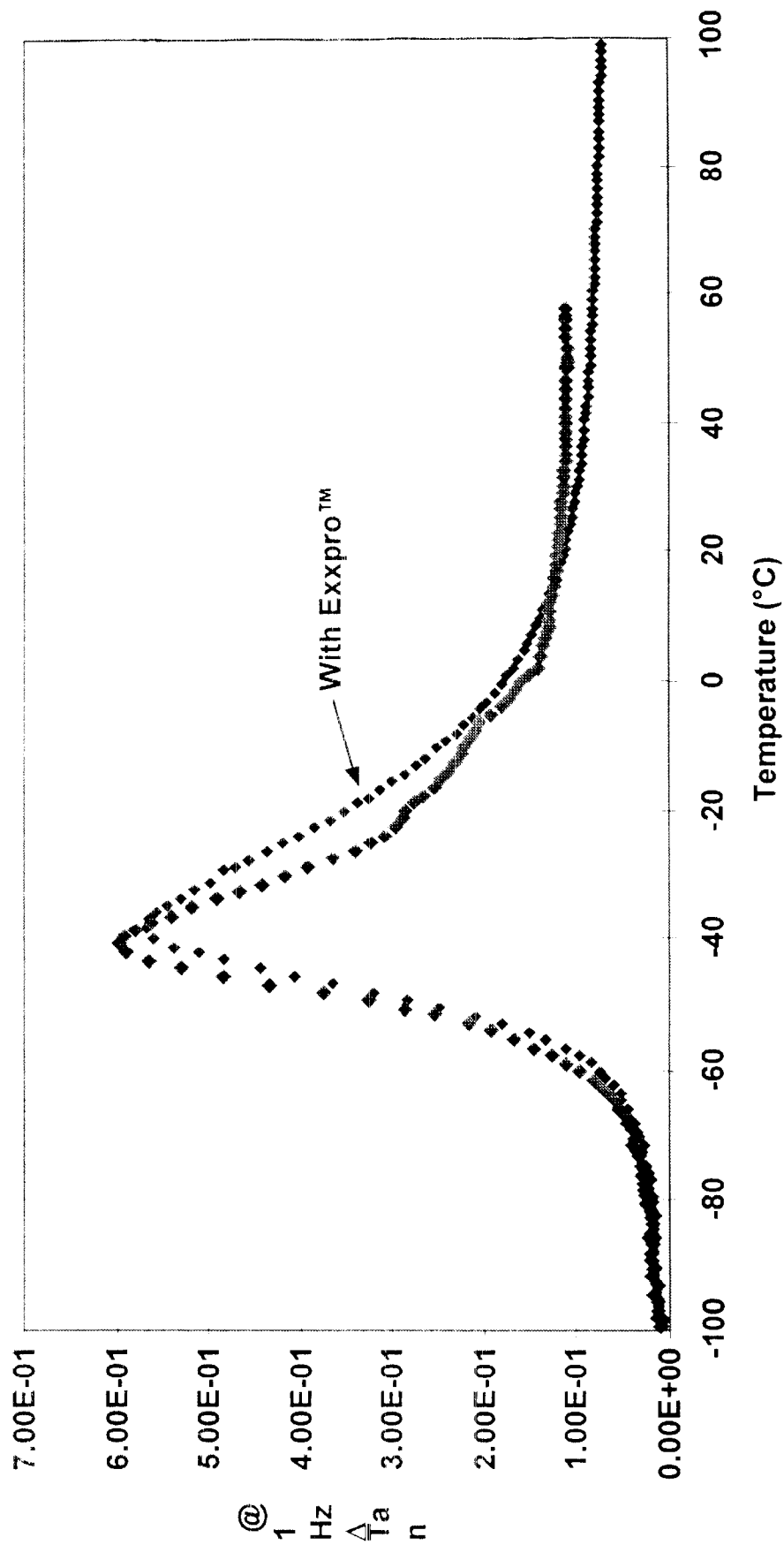

TRANSPARENT AND COLORABLE ELASTOMERIC COMPOSITIONS

This Application is a Continuation-in-Part of U.S. Ser. No. 09/211,628 filed on Dec. 15, 1998, which is based on U.S. Ser. No. 60/069,599 filed Provisionally Dec. 15, 1997.

FIELD OF THE INVENTION

The present invention relates to transparent and colorable elastomeric compositions and, more particularly, to transparent and colorable elastomeric compositions that can be used in reinforcing applications.

BACKGROUND OF THE INVENTION

Rubber compositions are used in a variety of applications, including tire components such as treads and sidewalls, hoses, belts, footwear components, vibration isolation devices and bladders. While the particular rubber compositions used in each of these applications vary widely in their physical properties, one attribute remains the same—their color. Most rubber compositions are black. Furthermore, most rubber compositions eventually become discolored due to heat, light, ozone, etc. This is particularly true for rubbers used in stressful, demanding applications such as tire treads and sidewalls.

Practitioners in this field will point to the presence of the reinforcing filler "carbon black" as a prime reason that most rubbers are black. While this is true, carbon black is not the only factor. In fact, a wide variety of other fillers, curatives, antidegradants, oils and the rubbers themselves can all result in a dark color that is essentially impossible to pigment. This is evident in compositions where carbon black has been replaced with a silica filler and the rubber is still discolored. For example, European Patent 0 682 071 B1 discloses a silica reinforced tire tread which, due to the presence of the aromatic processing oil, coupling agent, antidegradants and a sulfur curative system, will still be dark in color. In fact, it is uncertain how many of the ingredients present in the rubber composition would have to be changed to produce a colorable composition.

Of course, some colorable and transparent elastomeric compositions do exist. For example, clear EPDM elastomers are available. However, these elastomers do not covulcanize with other rubbers. Since many rubber applications involve combining several types of rubber to form a single article (i.e. tires), these EPDM elastomers are limited in their usefulness.

White sidewalls on tires are a form of colorable rubber. The white color is achieved by using fillers such as silica, clay, talc and carbonates instead of carbon black and adding titanium dioxide as a whitening pigment. However, the white color comes with a price. The fillers are more fragile than carbon black and result in a weak rubber composition that does not reinforce the tire. Therefore, the rubbers used for white sidewalls are also limited in their usefulness.

SUMMARY OF THE INVENTION

The present invention provides improved transparent and colorable elastomeric compositions. The transparent elastomeric compositions can be covulcanized with rubbers such as polybutadiene, polyisoprene, styrene-butadiene rubber, styrene-isoprene-butadiene rubber, isoprene-butadiene rubber, ethylene-propylene diene rubber or natural rubber. The colorable rubber compositions have sufficient properties to function as a reinforcing member in an automobile tire. Preferably, both the transparent and colorable elastomeric compositions include at least one copolymer of a $C_4$ to $C_7$ isoolefin and a para-alkylstyrene, silica and a coupling agent.

The elastomeric compositions of the present invention are useful in a variety of applications, particularly pneumatic tire components, hoses, belts, solid tires, footwear components, rollers for graphic arts applications, vibration isolation devices, pharmaceutical devices, adhesives, sealants, protective coatings and bladders for fluid retention and curing purposes.

BRIEF DESCRIPTION OF THE DRAWINGS

FIG. 1 is a graphic illustration of the relationship between the Tan Δ and Temperature for the polymer product produced in Example 7.

DETAILED DESCRIPTION OF THE INVENTION

In one embodiment of the present invention, an elastomeric composition is produced which exhibits transparent properties. The term "transparent", as used herein is defined as transmission of light without substantial scattering such that visual identification can be made of objects behind the elastomeric composition. Degrees of transparency can vary from contact transparency to complete transparency.

The transparent elastomer compositions of the present invention do not contain carbon black. The transparent feature of the composition is obtained in part by using fillers which are finer than the wavelength of visible light. Silica is preferred as the filler, however other non-black fillers such as clays, talcs and other mineral fillers may be used. In addition, the remaining components of the final composition are selected on the basis that they will not interfere with the transparent nature of the elastomer.

The transparent elastomeric compositions of the present invention can be covulcanized with polybutadiene, polyisoprene, styrene-butadiene rubber, styrene-isoprene-butadiene rubber, isoprene-butadiene rubber, ethylene-propylene diene rubber or natural rubber. Preferably, they contain at least one copolymer of a $C_4$ to $C_7$ isoolefin and a para-alkylstyrene. Preferably, the $C_4$ to $C_7$ isoolefin is isobutylene. In addition, the para-alkylstyrene is preferably para-methylstyrene. Most preferably, the copolymer is a terpolymer of isobutylene, para-methylstyrene and bromo para-methylstyrene.

In a preferred embodiment, the transparent elastomeric compositions of the present invention contain from 10 to 100 parts, per hundred parts rubber, of a copolymer of a $C_4$ to $C_7$ isoolefin and a para-alkylstyrene; from 10 to 100 parts of silica; and from 0 to 20 weight percent of a coupling agent, based on the weight of silica. Furthermore, the elastomeric compositions will exhibit contact transparency. Preferably, the transparent elastomeric compositions will also contain from 10 to 90 parts, per hundred parts rubber, of polybutadiene, polyisoprene, styrene-butadiene rubber, styrene-isoprene-butadiene rubber, isoprene-butadiene rubber, ethylene-propylene diene rubber, or blends thereof. More preferably, the transparent elastomeric compositions will contain from 30 to 80 parts, per hundred parts rubber, of polybutadiene, polyisoprene, styrene-butadiene rubber, styrene-isoprene-butadiene rubber, isoprene-butadiene rubber, ethylene-propylene diene rubber, or blends thereof.

The copolymer used in the transparent elastomeric compositions of the present invention is preferably a terpolymer of isobutylene, para-methylstyrene and bromo para-methylstyrene. In addition, this terpolymer preferably composes from 20 to 100 parts, per hundred parts rubber, of the transparent elastomeric composition. More preferably, the terpolymer composes from 30 to 80 parts, per hundred parts rubber, of the transparent elastomeric composition.

The silica used in the transparent elastomeric compositions of the present invention is preferably precipitated silica. Also, the precipitated silica preferably composes from 30 to 80 parts of the transparent elastomeric composition. More preferably, it composes from 40 to 70 parts. The coupling agent used in the transparent elastomeric compositions of the present invention is preferably an organosilane-coupling agent. Preferably, the organosilane-coupling agent composes from 2 to 15 weight percent, based on the weight of silica, of the transparent elastomeric composition. More preferably, it composes from 5 to 10 weight percent.

The transparent elastomers of the present invention will have utility in the areas of transparent tire sidewalls, transparent tire treads, transparent footwear, bladders and shoe soles.

In another embodiment of the present invention, an elastomer blend is produced which is colorable. The term "colorable", as used herein, is defined as the ability of the base elastomeric composition to be pigmented to afford a variety of colored compositions. These compositions typically do not contain carbon black.

The colorable rubber compositions of the present invention have sufficient properties to function as a reinforcing member in an automobile tire. Preferably, they have sufficient properties to function as an automobile tire tread. The colorable rubber compositions of the present invention preferably contain at least one copolymer of a $C_4$ to $C_7$ isoolefin and a para-alkylstyrene. More preferably, the copolymer is a terpolymer of isobutylene, para-methylstyrene and bromo para-methylstyrene.

In a preferred embodiment, the colorable rubber compositions of the present invention contain from 10 to 100 parts, per hundred parts rubber, of a copolymer of a $C_4$ to $C_7$ isoolefin and a para-alkylstyrene; from 10 to 100 parts of silica; and from 0 to 20 weight percent of a coupling agent, based on the weight of silica. Furthermore, the colorable rubber compositions of the present invention preferably contain from 10 to 90 parts, per hundred parts rubber, of natural rubber, polybutadiene, polyisoprene, styrene-butadiene rubber, styrene-isoprene-butadiene rubber, isoprene-butadiene rubber, ethylene-propylene diene rubber, neoprene, polychloroprene, butyl rubber, nitrile rubber or blends thereof. More preferably, the colorable rubber compositions will contain from 30 to 80 parts, per hundred parts rubber, of natural rubber, polybutadiene, polyisoprene, styrene-butadiene rubber, styrene-isoprene-butadiene rubber, isoprene-butadiene rubber, ethylene-propylene diene rubber, neoprene, polychloroprene, butyl rubber, nitrile rubber or blends thereof.

The copolymer used in the colorable rubber compositions of the present invention is preferably a terpolymer of isobutylene, para-methylstyrene and bromo para-methylstyrene. In addition, this terpolymer preferably composes from 20 to 100 parts, per hundred parts rubber, of the colorable rubber composition. More preferably, the terpolymer composes from 30 to 80 parts, per hundred parts rubber, of the colorable rubber composition.

The silica used in the colorable rubber compositions of the present invention is preferably precipitated silica. Also, the precipitated silica preferably composes from 30 to 80 parts of the colorable rubber composition. More preferably, it composes from 40 to 70 parts. The coupling agent used in the colorable rubber compositions of the present invention is preferably an organosilane-coupling agent. Preferably, the organosilane-coupling agent composes from 2 to 15 weight percent, based on the weight of silica, of the colorable rubber composition. More preferably, it composes from 5 to 10 weight percent.

The colorable rubber compounds of the present invention are useful in making colored elastomeric products capable of meeting current performance requirements. These colorable compounds were produced by replacing carbon black filler with a non-staining mineral filler such as, but not limited to, fumed or precipitated silicas, clays, talcs, calcium carbonates, aluminum oxides, titanium oxides, silicon oxides and zinc oxides. The mineral filler must reinforce the polymer system and not inhibit pigmentation to be effective. In addition, the remaining components of the colorable compound were selected on the basis that they will not interfere with the colorable nature of the elastomer. The cured, colorable compounds of the present invention still have the same dynamic and physical properties that meet the performance demands of current black-colored tire treads.

As stated above, all components of the transparent and colorable elastomeric compositions must be carefully selected so that they will not interfere with the transparency and/or colorability of the composition. For example, the elastomers, fillers, processing aids, antidegradants and curatives should not discolor the composition during the formation of the elastomeric composition. Furthermore, the components should not discolor the elastomeric composition as a result of exposure to light (including UV), heat, oxygen, ozone and strain.

The fillers of the present invention may be any size and typically range, e.g., in the tire industry, from about 0.0001 to about 100 microns. As used herein, silica is meant to refer to any type or particle size silica or another silicic acid derivative, or silicic acid, processed by solution, pyrogenic or the like methods and having a surface area, including untreated, precipitated silica, crystalline silica, colloidal silica, aluminum or calcium silicates, fumed silica, and the like.

One or more coupling agents are preferably used in the elastomeric compositions of the present invention. More preferably, the coupling agent is a bifunctional organosilane cross-linking agent. By an "organosilane cross-linking agent" is meant any silane coupled filler and/or cross linking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane (sold commercially as "A1100" by Witco), gamma-mercaptopropyltrimethoxysilane and the like, and mixtures thereof In a preferred embodiment, the organosilane cross-linking agent is selected from the group consisting of bis-(3(triethoxysilyl)-propyl)-tetrasulfane (sold commercially as "Si69" by Degussa), gamma-mercaptopropyltrimethoxysilane (sold commercially as "Si189" by Degussa), and 3-thiocyanatopropyl-triethoxy silane (sold commercially as "Si264" by Degussa). More preferably, bis-(3(triethoxysilyl)-propyl)-tetrasulfane is employed.

The copolymer of a $C_4$ to $C_7$ isoolefin and a para-alkylstyrene of the present invention also encompasses terpolymers of a $C_4$ to $C_7$ isoolefin, para-alkylstyrene and halogenated para-alkylstyrene. The percentages of para-alkylstyrene and halogenation can vary widely. Different applications may require dramatically different formulations. Generally, the copolymer of the present invention will have from 2 wt. % to 20 wt. % para-alkylstyrene (preferably para-methylstyrene). In addition, the copolymer of the present invention will have from 0.20 mol % to 2.0 mol % of a halogenated compound, such as bromomethylstyrene.

Preferably, low levels of either bromine and/or para-alkylstyrene are used. In a preferred embodiment, para-alkylstyrene (preferably para-methylstyrene) comprises from 5 wt. % to 10 wt. % of the copolymer. More preferably, it is about 5 wt. % of the copolymer. In another preferred embodiment, a halogenated compound, such as bromomethylstyrene comprises from 0.40 mol % to 3.0 mol % of the copolymer. More preferably, it comprises from 0.50 mol % to 1.25 mol % of the copolymer. Most preferably, it is about 0.75 mol % of the copolymer.

The compositions produced in accordance with the present invention may also contain other components and additives customarily used in rubber mixes, such as effective amounts of nondiscolored and nondiscoloring processing aids, pigments, accelerators, cross-linking and curing materials, antioxidants, antiozonants, fillers and naphthenic, aromatic or paraffinic extender oils if the presence of an extension oil is desired. Processing aids include, but are not limited to, plasticizers, tackifiers, extenders, chemical conditioners, homogenizing agents and peptizers such as mercaptans, petroleum and vulcanized vegetable oils, waxes, resins, rosins, and the like. Accelerators include amines, guanidines, thioureas, thiazoles, thiurams, sulfenamides, sulfenamides, thiocarbamates, xanthates, and the like. Cross-linking and curing agents include sulfur, zinc oxide, and fatty acids. Peroxide cure systems may also be used. Fillers include mineral fillers such as silica and clay.

The present invention provides improved elastomeric compositions comprising a copolymer of a $C_4$ to $C_7$ isoolefin and a para-alkylstyrene, silica and, optionally, one or more coupling agents. These compositions exhibit improved properties including improved abrasion resistance, reduced cut growth, improved adhesion, reduced heat build-up, and retention of mechanical properties during severe heat build-up conditions such as those experienced in "run-flat" tires and engine mounts for transportation vehicles. The substantially isoolefin (isobutylene) backbone elastomer is a key element in that it imparts a self-limiting heat build-up. At lower temperatures, these elastomers exhibit high damping behavior which dissipates mechanical energy in the form of heat. However, as the elastomer heats up, the damping behavior diminishes and the behavior of the elastomer in more elastic and less dissipative.

Generally, polymer blends, e.g., those used to produce tires, are crosslinked. It is known that the physical properties, performance characteristics, and durability of vulcanized rubber compounds are directly related to the number (crosslink density) and type of crosslinks formed during the vulcanization reaction. (See, e.g., *The Post Vulcanization Stabilization for NR*, W. F. Helt, B. H. To & W. W. Paris, Rubber World, August 1991, pp. 18–23 which is incorporated by reference herein.) Generally, polymer blends may be crosslinked by adding curative molecules, for example sulfur, metal oxides (i.e., zinc oxide), organometallic compounds, radical initiators, etc. followed by heating. This method may be accelerated and is often used for the vulcanization of elastomer blends. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous curatives are known in the art and include, but are not limited to, the following: zinc oxide, stearic acid, tetramethylthiuram disulfide (TMTD), 4,4'-ditliodimorpholine (DTDM), tetrabutylthiuram disulfide (TBTD), benzothiazyl disulfide (MBTS), hexamethylene-1,6-bisthiosulfate disodium salt dihydrate (sold commercially as DURALINK HTS by Flexsys), 2-(morpholinothio) benzothiazole (MBS or MOR), blends of 90% MOR and 10% MBTS (MOR 90), and N-oxydiethylene thiocarbamyl-N-oxydiethylene sulfonamide (OTOS) zinc 2-ethyl hexanoate (ZEH). In addition, various vulcanization systems are known in the art. (For example, see *Formulation Design and Curing Characterstics of NBR Mixes for Seals, Rubber World*, September 1993, pp. 25–30 which is incorporated by reference herein).

The materials are mixed by conventional means known to those skilled in the art, in a single step or in stages. For example, the elastomers of this invention can be processed in one step. In a preferred embodiment, the silica and silane are added in a different stage from zinc oxide and other cure activators and accelerators. In a more preferred embodiment, antioxidants, antiozonants and processing materials are added in a stage after silica and silane have been processed with the rubber, and zinc oxide is added at a final stage to maximize compound modulus. Thus, a two to three (or more) stage processing sequence is preferred. Additional stages may involve incremental additions of filler and processing oils.

INDUSTRIAL UTILITY

The elastomeric compositions of the present invention are not only transparent, but can be covulcanized with other rubbers. This results in a transparent elastomer that can be used in wide variety of applications outside of the uses for known transparent elastomers. For example, the transparent elastomeric compositions of the present invention can be used in tires.

The colorable elastomeric compositions of the present invention exhibit improved hysteretic properties, traction, heat stability and retention of properties upon aging to known colorable elastomers. This results in colorable rubber compositions which have sufficient properties to function as a reinforcing member in an automobile tire. The colorable rubber will allow a manufacturer to produce a tire with improved product appearance.

The elastomeric compositions of the present invention are useful in a variety of applications, particularly pneumatic tire components, hoses, belts, solid tires, footwear components, rollers for graphic arts applications, vibration isolation devices, pharmaceutical devices, adhesives, sealants, protective coatings and bladders for fluid retention and curing purposes.

EXAMPLES

Example 1

Experiments were conducted to produce transparent elastomers. Master batches of EXXPRO™ Elastomers (a terpolymer of isobutylene, para-methylstyrene and bromo para-methylstyrene, commercially available from Exxon Chemical Company) of varying bromination level, comonomer content, and molecular weight were prepared. The copolymers had the properties listed in Table 1.

TABLE 1

Properties of the Copolymers

| PROPERTY | COPOLYMER EXXPRO ™ 89-1 | COPOLYMER EXXPRO ™ 97-2 |
|---|---|---|
| Para-Methylstyrene (wt. %) | 5.0 | 10 |
| Bromomethylstyrene (mol %) | 0.75 | 0.98 |
| Mooney Viscosity (ML(1 + 8) 125° C.) | 38 ± 5 | 45 ± 5 |

Test compositions were compounded to blend the master batch components and the cure additives listed in Table 2. FLEXON 785 is a naphthenic petroleum oil. DIAK #1 is hexamethylene diamine carbonate, available from Du Pont/Dow elastomers. DPG is Diphenylguanidine.

TABLE 2

Formulations of Test Compositions A–F

| Master Batch (phr) | A | B | C | D | E | F |
|---|---|---|---|---|---|---|
| EXXPRO ™ 89-1 | 100 | 100 | 100 | | | |
| EXXPRO ™ 97-2 | | | | 100 | 100 | 100 |
| HISIL 233 | 45 | 45 | 45 | 45 | 45 | 45 |
| FLEXON 785 | 14 | 14 | 14 | 14 | 14 | 14 |
| DIAK #1 | 3 | 4 | 4 | 3 | 4 | 4 |
| DPG | 3 | 2 | 3 | 3 | 2 | 3 |

The test compositions (A through F) were tested for cure characteristics, hardness and tensile strength. The results are presented in Table 3.

TABLE 3

Properties of Test Compositions A–F

| Properties | A | B | C | D | E | F |
|---|---|---|---|---|---|---|
| MS @ 135° C. | | | | | | |
| 5 pt. Rise, min. | | | 4.14 | 2.17 | 0.42 | 1.67 |
| 10 pt. Rise, min. | | | 4.33 | 2.57 | 1.75 | 1.89 |
| ML(1 + 4) @ 100° C. | | 108 | 125 | 127 | | 128 |
| MDR @ 155° C., ½° Arc | | | | | | |
| ml, dN · m | 5.88 | 5.76 | 4.67 | 3.23 | 2.67 | 5.67 |
| mh, dN · m | 12.5 | 17.0 | 15.5 | 15.3 | 15.0 | 15.1 |
| ts2, min | 1.7 | 1.2 | 0.9 | | | 1.1 |
| t25, min | 1.2 | 1.7 | 1.2 | | | 1.3 |
| t90, min | 35.3 | 31.3 | 27.8 | 25.9 | | 28.9 |
| Physical Properties, Cured 6.5' @ 155° C. | | | | | | |
| Shore A | 60 | 60 | 60 | 64 | 58 | 61 |
| 100% Modulus, MPa | 1.5 | 2.6 | 2.6 | 2.6 | 2.2 | 2.0 |
| 300% Modulus, MPa | 4.6 | 5.8 | 6.2 | 6.1 | 8.2 | 4.8 |
| Tensile, MPa | 6.0 | 7.6 | 9.1 | 8.8 | 8.7 | 7.1 |
| Elongation, % | 380 | 380 | 390 | 420 | 320 | 390 |
| DIN Abrasion | 71 | | 66 | 69 | 69 | 68 |

The samples all demonstrated contact transparency.

Example 2

A Minolta CR-100 ChromaMeter was used to quantitatively determine the lightness ($L^*$), red-green ($a^*$) and yellow-blue ($b^*$) colors of cured compounds in order to maximize light through-put (a measure of transparency) and to minimize or adjust the color. The ability to read print through these cured rubber compounds was also used as a subjective evaluation of the contact transparency of the ingredients in the formulation. Statistically designed experiments varying ingredients, and statistical analysis of variance (ANOVA) for effects on compound cure, physical and color properties were made.

Eight formulations of EXXPRO™ elastomers with statistically varying para-methylstyrene and bromomethylstyrene levels were evaluated in a simple compound prepared only with precipitated silica and a zinc oxide/zinc stearate cure system. It was established that low levels of either bromine and/or para-methylstyrene provided the highest $L^*$ values with low, but not negative, $a^*$ and $b^*$ values, see Table 4. EXXPRO™ MDX 89-1 (5 wt-% pMS, 0.75 mol-% Br) afforded the highest $L^*$ and lowest $a^*$ and $b^*$ values.

TABLE 4

Optical Properties of EXXPRO ™ Rubber Compounds

| Para-methylstyrene (weight-%) | Bromomethylstyrene (mole-%) | $L^*$ | $A^*$ | $b^*$ |
|---|---|---|---|---|
| 5 | 0.75 | 70.7 | 0.5 | 18.1 |
| 7.5 | 0.75 | 65.1 | 2.3 | 26.8 |
| 7.5 | 1.7 | 58.8 | 5.4 | 38.9 |
| 9.6 | 1.25 | 56.7 | 5.9 | 39.0 |
| 10 | 0.5 | 69.0 | 1.9 | 21.0 |
| 10 | 0.75 | 67.3 | 2.5 | 27.9 |
| 10 | 0.95 | 55.2 | 5.1 | 36.3 |
| 12.5 | 0.75 | 58.6 | 7.8 | 31.7 |

Example 3

Ten curative types thought useful in co-curing with the other sulfur-vulcanized tire compounds were screened. Acceptable curatives were zinc oxide/stearic acid; zinc oxide/zinc stearate; Hexamethylene-1,6-bis(thiosulphate) disodium salt dihydrate (sold commercially as DURALINK HTS by Flexsys)/zinc stearate; DURALINK HTS/zinc oxide; and 1,3-Bis(citraconimidomethyl)benzene (sold commercially as PERKALINK 900 by Flexsys)/zinc stearate, since their use afforded transparent compounds from nearly colorless to a yellow or beige color. Butyl zimate/zinc stearate afforded a transparent, light brown-colored compound. The use of CBS (N-cyclohexyl-2-benzothiazole sulfenamide) afforded a beige compound, amylphenyl disulfide polymer (18.5–21% sulfur) (sold commercially as VULTAC 5 by Elf Atochem North America) afforded a grey compound, and A1100 afforded a brown compound; none were visibly transparent based on the ability to read print.

Example 4

Precipitated silicas made via an aqueous acidification process were screened using EXXPRO™ MDX 89-1 as the elastomer and Duralink HTS/zinc stearate as the curative system. It was observed that for precipitated silicas having approximately the same CTAB surface area (approximately 170 m$^2$/g), use of a precipitated silica having a higher salt content afforded a brown-colored transparent compound (Zeosil 1165MP from Rhone Poulenc) compared to lower salt-content precipitated silicas which afforded yellow-colored transparent compounds. Use of a precipitated silica prepared using $CO_2$/hydrogen chloride as the acids (Hi-Sil 243LD from PPG) is more desirable than one prepared using sulfuric acid (Zeopol 8745 from J. M. Huber) since the former afforded a fainter-yellow transparent compound. Use of a higher surface area, low salt-containing precipitated silica (Hi-Sil 195G from PPG) is more desirable since it appeared to afford a more contact transparent compound, and improved cured compound physical properties. Use of a high surface area fumed silica made via a gas phase condensation process, which affords a silica with essentially no salt (Cab-O-Sil M5 from Cabot) is desirable for optical properties.

Example 5

Transparent cured EXXPRO™ compounds were prepared in blends with cis-polyisoprene and/or cis-polybutadiene using precipitated and fumed silicas as the fillers, and a sulfur curing system. All cured compounds were contact transparent, but had a yellow to brown color depending upon the specific ingredients, and afforded compounds with physical properties appropriate for use in a variety of rubber applications. Examples are shown in Table 5.

TABLE 5

Formulations and Properties of Transparent Rubber Compounds

| Example | G | H | I | J |
|---|---|---|---|---|
| Ingredients, phr | | | | |
| EXXPRO ™ MDX 96-4 | 50 | 50 | 50 | 50 |
| Natsyn 2200 | 50 | 50 | 50 | 50 |
| Silica, HiSil 243LD | 45 | 0 | 0 | 35 |
| Silica, HiSil 195T | 0 | 45 | 0 | 0 |
| Silica, Zeosil 1115MP | 0 | 0 | 45 | 0 |
| Silica, Cab-O-Sil M5 | 0 | 0 | 0 | 10 |
| Si69 | 3.6 | 3.6 | 3.6 | 3.6 |
| Oil, Flexon 766 | 6 | 6 | 6 | 6 |
| Wax, Paraffin | 4 | 4 | 4 | 4 |
| PEG 3350 | 4 | 4 | 4 | 4 |
| Zinc oxide | 1 | 1 | 1 | 1 |
| Stearic acid | 1 | 1 | 1 | 1 |
| Sulfur | 0.8 | 0.8 | 0.8 | 0.8 |
| MBTS | 0.6 | 0.6 | 0.6 | 0.6 |
| TBBS | 1.2 | 1.2 | 1.2 | 1.2 |
| DPG | 0.8 | 0.8 | 0.8 | 0.8 |
| Cure Properties | | | | |
| Minimum Torque, dN · m | 1.97 | 2.8 | 1.41 | 2.18 |
| Maximum Torque, dN · m | 8.47 | 10.3 | 7.04 | 8.95 |
| Delta Torque | 6.5 | 7.49 | 5.63 | 6.78 |
| ts2 Scorch, min | 1.26 | 1.29 | 1.33 | 1.29 |
| t50 Cure Time, min | 1.49 | 1.57 | 1.51 | 1.54 |
| t90 Cure Time, min | 2.5 | 2.29 | 2.52 | 2.41 |
| Physical Properties | | | | |
| Hardness | 49.9 | 53.5 | 47.1 | 51.1 |
| Strain at Break (%) | 582.42 | 479.04 | 576.32 | 611.96 |
| Stress at Break (MPa) | 8.44 | 8.91 | 11.11 | 10.11 |
| 20% Modulus (MPa) | 0.64 | 0.79 | 0.52 | 0.65 |
| 100% Modulus (MPa) | 1.43 | 1.84 | 1.25 | 1.45 |
| 300% Modulus (MPa) | 4.23 | 5.49 | 4.57 | 4.32 |
| Energy to Break (J) | 9.04 | 6.72 | 10.8 | 10 |
| Dispersion | 6.1 | 5.1 | 8 | 5.5 |
| DIN Abrasion Index | 90 | 99 | 105 | 95 |
| Mooney Viscosity (1 + 4 @ 100 C.) | 50.8 | 59.8 | 46.2 | 54.4 |
| Optical Properties | | | | |
| L | 69.7 | 74.5 | 77.1 | 76.2 |
| a* | 3.5 | 1.2 | 1.7 | 0.4 |
| b* | 44.6 | 40.2 | 37.2 | 38.2 |

Example 6

A formulation for a colorable tire tread was prepared, see Table 6. This formulation differs from a standard tire tread formulation in several ways. For example, EXXPRO™ polymers are used instead of an equal weight of solution-polymerized SBR to improve cured compound dynamic and physical properties. Also, Si69 is used as the silane-coupling agent instead of the more common X50S (which is 50% by weight Si69 carried on N330 carbon black). In addition, no antiozonant is used since this can also stain or discolor the tread composition. Compound colorability can be further improved by using titanium dioxide as a non-reinforcing, but whitening pigment.

TABLE 6

Colorable Rubber Compound Formulation

| | |
|---|---|
| Brominated isobutylene-co-para-methylstyrene (EXXPRO ™) - varying bromine, para-methylstyrene contents | 20 phr |
| Styrene-butadiene rubber (sSBR) - varying styrene, vinyl contents | 55 |
| Polybutadiene, 98% cis | 25 |
| Precipitated silica | 75 |
| Titanium dioxide | 20 |
| Silane coupling agent (10% of silica), Si-69 | 7.5 |
| Aromatic oil, Sundex 8125 | 24 |
| Zinc oxide | 2 |
| Stearic acid | 1 |
| Antioxidant, mixed diaryl-p-phenylenediamine | 0.75 |
| Sulfur | 1.2 |
| Sulfeneamide, N-Cyclohexyl-2-benzothiazyl-sulfeneamide (CBS) | 1.75 |
| Diphenylguanidine | 1.2 |

Example 7

The viscoelastic nature of EXXPRO™ elastomers increases the loss modulus (G") or tangent delta values of the cured compound measured at 0° C., see FIG. 1. This dynamic value is a laboratory test useful in predicting the wet traction performance of tread compounds on tires. A higher value is desirable. The tangent delta value measured at 60° C. in lab instruments is reduced when using EXXPRO™ elastomers (see FIG. 1) indicating a lower heat build-up value. This is predictive of tire rolling resistance. A lower value is desirable. The complex modulus value (G*) measured at 60° C. is used as a lab predictor of the dry handling, or cornering, characteristics of the tread compound on the tire. A higher value is needed when a higher speed rated tire (i.e. H-, V-, Z-rated) is desirable. The magnitude of these benefits when using EXXPRO™ elastomers is also dependent on the particular polymers used in the blend system. The addition of an EXXPRO™ elastomer will improve one or more of these dynamic properties, see Table 7.

TABLE 7

Colorable Rubber Compound Properties

|  | K | L | M | N | O | P | Q | R |
|---|---|---|---|---|---|---|---|---|
| EXXPRO ™, phr | 0 | 20 | 0 | 20 | 0 | 20 | 0 | 20 |
| SSBR, phr | 75 | 55 | 75 | 55 | 75 | 55 | 75 | 55 |
| - sSBR, %-styrene | 15 | 15 | 15 | 15 | 20 | 20 | 23 | 23 |
| - sSBR, %-vinyl | 57 | 57 | 30 | 30 | 63 | 63 | 58 | 58 |
| Cure Properties |  |  |  |  |  |  |  |  |
| Minimum Torque, dN.m | 3.21 | 2.22 | 4.05 | 4.21 | 3.85 | 3.37 | 4.29 | 4.42 |
| Maximum Torque, dN.m | 20.27 | 18.45 | 22.95 | 23.20 | 19.50 | 20.53 | 22.10 | 21.10 |
| Ts2 Scorch, min | 2.81 | 4.22 | 2.27 | 2.91 | 2.65 | 3.90 | 2.59 | 3.33 |
| T'50 | 4.74 | 6.56 | 3.89 | 5.22 | 4.49 | 6.59 | 5.07 | 6.13 |
| T'90 | 9.99 | 12.60 | 6.91 | 9.19 | 11.53 | 13.21 | 9.66 | 12.19 |
| Physical Properties |  |  |  |  |  |  |  |  |
| Hardness | 60.30 | 57.90 | 62.10 | 64.70 | 62.70 | 64.70 | 64.90 | 63.70 |
| Elongation (%) | 335.42 | 322.16 | 349.45 | 346.48 | 299.62 | 255.32 | 299.24 | 254.22 |
| Stress at Break (MPa) | 16.48 | 13.03 | 16.68 | 15.19 | 16.09 | 12.08 | 15.05 | 12.36 |
| 20% Modulus (MPa) | 0.96 | 0.84 | 1.00 | 1.08 | 0.92 | 1.07 | 1.01 | 1.04 |
| 100% Modulus (MPa) | 2.47 | 2.36 | 2.49 | 2.81 | 2.75 | 3.22 | 2.94 | 3.20 |
| 300% Modulus (MPa) | 13.92 | 11.59 | 13.26 | 12.5 | — | — | — | — |
| Energy to Break (J) | 5.90 | 4.91 | 6.44 | 6.59 | 6.31 | 3.98 | 6.06 | 3.78 |
| Dispersion Rating | 8.6 | 7.4 | 8.8 | 7.5 | 7.9 | 7.8 | 8.1 | 7.7 |
| Din Abrasion Index | 125 | 119 | 141 | 112 | 114 | 90 | 109 | 97 |
| Dynamic Properties |  |  |  |  |  |  |  |  |
| G" @ 0 C. (MPa) | 0.4486 | 0.2743 | 0.4462 | 0.6187 | 0.4802 | 0.6098 | 0.7162 | 0.5347 |
| Tangent delta @ 0° C. | 0.1715 | 0.1594 | 0.1626 | 0.1969 | 0.1878 | 0.2314 | 0.2126 | 0.2095 |
| G* @ 60 C. (MPa) | 1.9111 | 1.2963 | 2.0522 | 2.1211 | 1.7042 | 1.9006 | 2.1562 | 1.7225 |
| Tangent delta @ 60 C. | 0.1153 | 0.0995 | 0.1096 | 0.1085 | 0.0942 | 0.0985 | 0.1374 | 0.1071 |

While certain representative embodiments and details have been shown for the purposes of illustrating the invention, it will be apparent to those skilled in the art that various changes in the process and products disclosed herein may be made without departing from the scope of the invention, which is defined in the appended claims.

We claim:

1. A colorable or transparent elastomeric composition comprising:
    a) from 10 to 100 parts, per hundred parts rubber, of a halogenated copolymer of a $C_4$ to $C_7$ isoolefin and a para-alkylstyrene;
    b) from 10 to 90 parts, per hundred parts rubber, of a compound selected from the group consisting of polybutadiene, natural rubber, styrene-isoprene rubber, neoprene, polychloroprene, butyl rubber, nitrile rubber, polyisoprene, styrene-butadiene rubber, styrene-isoprene-butadiene rubber, isoprene-butadiene rubber, ethylene-propylene diene rubber, and blends thereof;
    c) from 30 to 80 parts of a non-black filler; and
    d) a paraffinic processing aid;
wherein the colorable or transparent elastomeric composition has a ChromaMeter L value of greater than 55.

2. The colorable or transparent elastomeric composition of claim 1, wherein the $C_4$ to $C_7$ isoolefin is isobutylene; the para-alkylstyrene is para-methylstyrene; and the non-black filler is silica.

3. The colorable or transparent elastomeric composition of claim 2, wherein the silica is precipitated silica.

4. The colorable or transparent elastomeric composition of claim 1 or 2, wherein the colorable or transparent elastomeric composition further comprises from 2 to 20 weight percent of an organosilane-coupling agent, based on the weight of the non-black filler.

5. The colorable or transparent elastomeric composition of claim 4, wherein the colorable or transparent elastomeric composition comprises from 2 to 15 weight percent of the organosilane-coupling agent, based on the weight of the non-black filler.

6. The colorable or transparent elastomeric composition of claim 4, wherein the organosilane-coupling agent is selected from the group consisting of vinyl triethoxysilane, vinyl-tris-(beta-methoxyethoxy)silane, methacryloylpropyltrimethoxysilane, gamma-amino-propyl triethoxysilane, 3-thiocyanatopropyl-triethoxy silane, gamma-mercaptopropyltrimethoxysilane, and mixtures thereof.

7. The colorable or transparent elastomeric composition of claim 4, wherein the organosilane-coupling agent is bis(3-(triethoxysilyl)-propyl)-tetrasulfane.

8. The colorable or transparent elastomeric composition of claim 1 or 2, wherein the colorable or transparent elastomeric composition is covulcanized.

9. The colorable or transparent elastomeric composition of claim 1 or 2, wherein the colorable or transparent elastomeric composition is cured.

10. The colorable or transparent elastomeric composition of claim 1, wherein the ChromaMeter L value is from 65 to 80.

11. The colorable or transparent elastomeric composition of claim 10, wherein the colorable or transparent elastomeric composition has a ChromaMeter b value of 40 or less.

12. The colorable or transparent elastomeric composition of claim 10, wherein the colorable or transparent elastomeric composition has a ChromaMeter b value of 35 or less.

13. The colorable or transparent elastomeric composition of claim 10, wherein the colorable or transparent elastomeric composition has a ChromaMeter b value of 30 or less.

14. A colorable or transparent elastomeric composition comprising:
    a) from 10 to 100 parts, per hundred parts rubber, of a halogenated copolymer of a $C_4$ to $C_7$ isoolefin and a para-alkylstyrene, wherein the copolymer has a Mooney viscosity of from 30 to 50;

b) from 10 to 90 parts, per hundred parts rubber, of a compound selected from the group consisting of polybutadiene, natural rubber, styrene-isoprene rubber, neoprene, polychloroprene, butyl rubber, nitrile rubber, polyisoprene, styrene-butadiene rubber, styrene-isoprene-butadiene rubber, isoprene-butadiene rubber, ethylene-propylene diene rubber, and blends thereof;

c) from 30 to 80 parts of a non-black filler; and d) a paraffinic processing aid;

wherein the colorable or transparent elastomeric composition has a ChromaMeter L value of greater than 55.

15. The colorable or transparent elastomeric composition of claim 14, wherein the $C_4$ to $C_7$ isoolefin is isobutylene; the para-alkylstyrene is para-methylstyrene; and the non-black filler is silica.

16. The colorable or transparent elastomeric composition of claim 15, wherein the silica is precipitated silica.

17. The colorable or transparent elastomeric composition of claim 14 or 15, wherein the colorable or transparent elastomeric composition further comprises from 2 to 20 weight percent of an organosilane-coupling agent, based on the weight of the non-black filler.

18. The colorable or transparent elastomeric composition of claim 17, wherein the colorable or transparent elastomeric composition comprises from 2 to 15 weight percent of the organosilane-coupling agent, based on the weight of the non-black filler.

19. The colorable or transparent elastomeric composition of claim 17, wherein the organosilane-coupling agent is selected from the group consisting of vinyl triethoxysilane, vinyl-tris-(beta-methoxyethoxy)silane, methacryloylpropyltrimethoxysilane, gamma-amino-propyl triethoxysilane, 3-thiocyanatopropyl-triethoxy silane, gamma-mercaptopropyltrimethoxysilane, and mixtures thereof.

20. The colorable or transparent elastomeric composition of claim 17, wherein the organosilane-coupling agent is bis(3-(triethoxysilyl)-propyl)-tetrasulfane.

21. The colorable or transparent elastomeric composition of claim 14 or 15, wherein the colorable or transparent elastomeric composition is covulcanized.

22. The colorable or transparent elastomeric composition of claim 14 or 15, wherein the colorable or transparent elastomeric composition is cured.

23. The colorable or transparent elastomeric composition of claim 14, wherein the ChromaMeter L value is from 65 to 80.

24. The colorable or transparent elastomeric composition of claim 14, wherein the colorable or transparent elastomeric composition has a ChromaMeter b value of 40 or less.

25. The colorable or transparent elastomeric composition of claim 23, wherein the colorable or transparent elastomeric composition has a ChromaMeter b value of 35 or less.

26. The colorable or transparent elastomeric composition of claim 23, wherein the colorable or transparent elastomeric composition has a ChromaMeter b value of 30 or less.

27. A colorable or transparent elastomeric composition comprising:

a) from 10 to 100 parts, per hundred parts rubber, of a terpolymer of isobutylene, para-alkylstyrene, and halogenated para-alkylstyrene;

b) from 10 to 90 parts, per hundred parts rubber, of a compound selected from the group consisting of polybutadiene, natural rubber, styrene-isoprene rubber, neoprene, polychloroprene, butyl rubber, nitrile rubber, polyisoprene, styrene-butadiene rubber, styrene-isoprene-butadiene rubber, isoprene-butadiene rubber, ethylene-propylene diene rubber, and blends thereof;

c) from 30 to 80 parts of a non-black filler; and d) a paraffinic processing aid;

wherein the colorable or transparent elastomeric composition has a ChromaMeter L value of greater than 55.

28. The colorable or transparent elastomeric composition of claim 27, wherein the para-alkylstyrene is para-methylstyrene; the halogenated para-alkylstyrene is bromo para-methylstyrene; and the non-black filler is silica.

29. The colorable or transparent elastomeric composition of claim 28, wherein the silica is precipitated silica.

30. The colorable or transparent elastomeric composition of claim 27 or 28, wherein the colorable or transparent elastomeric composition further comprises from 2 to 20 weight percent of an organosilane-coupling agent, based on the weight of the non-black filler.

31. The colorable or transparent elastomeric composition of claim 30, wherein the colorable or transparent elastomeric composition comprises from 2 to 15 weight percent of the organosilane-coupling agent, based on the weight of the non-black filler.

32. The colorable or transparent elastomeric composition of claim 30, wherein the organosilane-coupling agent is selected from the group consisting of vinyl triethoxysilane, vinyl-tris-(beta-methoxyethoxy)silane, methacryloylpropyltrimethoxysilane, gamma-amino-propyl triethoxysilane, 3-thiocyanatopropyl-triethoxy silane, gamma-mercaptopropyltrimethoxysilane, and mixtures thereof.

33. The colorable or transparent elastomeric composition of claim 30, wherein the organosilane-coupling agent is bis(3-(triethoxysilyl)-propyl)-tetrasulfane.

34. The colorable or transparent elastomeric composition of claim 27 or 28, wherein the colorable or transparent elastomeric composition is covulcanized.

35. The colorable or transparent elastomeric composition of claim 27 or 28, wherein the colorable or transparent elastomeric composition is cured.

36. The colorable or transparent elastomeric composition of claim 27, wherein the ChromaMeter L value is from 65 to 80.

37. The colorable or transparent elastomeric composition of claim 36, wherein the colorable or transparent elastomeric composition has a ChromaMeter b value of 40 or less.

38. The colorable or transparent elastomeric composition of claim 36, wherein the colorable or transparent elastomeric composition has a ChromaMeter b value of 35 or less.

39. The colorable or transparent elastomeric composition of claim 36, wherein the colorable or transparent elastomeric composition has a ChromaMeter b value of 30 or less.

40. A colorable or transparent elastomeric composition comprising:

a) from 10 to 100 parts, per hundred parts rubber, of a terpolymer of isobutylene, para-alkylstyrene, and halogenated para-alkylstyrene, wherein the terpolymer has a Mooney viscosity of from 30 to 50;

b) from 10 to 90 parts, per hundred parts rubber, of a compound selected from the group consisting of polybutadiene, natural rubber, styrene-isoprene rubber, neoprene, polychloroprene, butyl rubber, nitrile rubber, polyisoprene, styrene-butadiene rubber, styrene-isoprene-butadiene rubber, isoprene-butadiene rubber, ethylene-propylene diene rubber, and blends thereof;

c) from 30 to 80 parts of a non-black filter; and d) a paraffinic processing aid;

wherein the colorable or transparent elastomeric composition has a ChromaMeter L value of greater than 55.

41. The colorable or transparent elastomeric composition of claim 40, wherein the para-alkylstyrene is para-methylstyrene; the halogenated para-alkylstyrene is bromo para-methylstyrene; and the non-black filler is silica.

42. The colorable or transparent elastomeric composition of claim 41, wherein the silica is precipitated silica.

43. The colorable or transparent elastomeric composition of claim 40 or 41, wherein the colorable or transparent elastomeric composition further comprises from 2 to 20 weight percent of an organosilane-coupling agent, based on the weight of the non-black filler.

44. The colorable or transparent elastomeric composition of claim 43, wherein the colorable or transparent elastomeric composition comprises from 2 to 15 weight percent of the organosilane-coupling agent, based on the weight of the non-black filler.

45. The colorable or transparent elastomeric composition of claim 43, wherein the organosilane-coupling agent is selected from the group consisting of vinyl triethoxysilane, vinyl-tris-(beta-methoxyethoxy)silane, methacryloylpropyltrimethoxysilane, gamma-amino-propyl triethoxysilane, 3-thiocyanatopropyl-triethoxy silane, gamma-mercaptopropyltrimethoxysilane, and mixtures thereof.

46. The colorable or transparent elastomeric composition of claim 43, wherein the organosilane-coupling agent is bis(3-(triethoxysilyl)-propyl)tetrasulfane.

47. The colorable or transparent elastomeric composition of claim 40 or 41, wherein the colorable or transparent elastomeric composition is covulcanized.

48. The colorable or transparent elastomeric composition of claim 40 or 41, wherein the colorable or transparent elastomeric composition is cured.

49. The colorable or transparent elastomeric composition of claim 40, wherein the ChromaMeter L value is from 65 to 80.

50. The colorable or transparent elastomeric composition of claim 49, wherein the colorable or transparent elastomeric composition has a ChromaMeter b value of 40 or less.

51. The colorable or transparent elastomeric composition of claim 49, wherein the colorable or transparent elastomeric composition has a ChromaMeter b value of 35 or less.

52. The colorable or transparent elastomeric composition of claim 49, wherein the colorable or transparent elastomeric composition has a ChromaMeter b value of 30 or less.

* * * * *